(12) United States Patent
Sarno et al.

(10) Patent No.: US 11,772,830 B2
(45) Date of Patent: Oct. 3, 2023

(54) AERONAUTICAL EQUIPMENT

(71) Applicant: THALES, Courbevoie (FR)

(72) Inventors: Claude Sarno, Valence (FR); Romain Hodot, Valence (FR); Philippe Oconte, Valence (FR)

(73) Assignee: THALES, Courbevoie (FR)

( * ) Notice: Subject to any disclaimer, the term of this patent is extended or adjusted under 35 U.S.C. 154(b) by 369 days.

(21) Appl. No.: 16/824,857

(22) Filed: Mar. 20, 2020

(65) Prior Publication Data

US 2020/0354088 A1 Nov. 12, 2020

(30) Foreign Application Priority Data

Mar. 27, 2019 (FR) ...................................... 19 03182

(51) Int. Cl.
*B64G 1/50* (2006.01)
*B64D 15/02* (2006.01)
*B64G 1/36* (2006.01)
*B64G 1/58* (2006.01)

(52) U.S. Cl.
CPC ............. *B64G 1/506* (2013.01); *B64D 15/02* (2013.01); *B64G 1/36* (2013.01); *B64G 1/58* (2013.01)

(58) Field of Classification Search
CPC .................................................... B64D 15/02
See application file for complete search history.

(56) References Cited

U.S. PATENT DOCUMENTS

| 10,180,449 | B2 | 1/2019 | Essawy et al. | |
|---|---|---|---|---|
| 2011/0247432 | A1* | 10/2011 | Kelnhofer | B64D 13/00 73/861.351 |
| 2017/0029120 | A1* | 2/2017 | Hodot | B22F 5/10 |
| 2018/0229850 | A1 | 8/2018 | Menheere et al. | |
| 2019/0308721 | A1* | 10/2019 | Kakaley | B64C 27/57 |

FOREIGN PATENT DOCUMENTS

| FR | 3 041 703 A1 | 3/2017 | |
|---|---|---|---|
| FR | 3077268 A1 * | 8/2019 | B64D 15/02 |

OTHER PUBLICATIONS

French Search Report, from the French Patent Office in counterpart French Application No. 1903182, dated Jan. 16, 2020.

* cited by examiner

*Primary Examiner* — Philip J Bonzell
*Assistant Examiner* — Brendan Kroger Schneider
(74) *Attorney, Agent, or Firm* — ArentFox Schiff LLP

(57) ABSTRACT

This aeronautical equipment for an aircraft, comprising a part configured to be positioned at the level of a skin of the aircraft and means for reheating this part comprising a closed-circuit thermodynamic loop in which a phase-change heat transfer fluid circulates, is wherein it includes means for monitoring the fluid pressure in the loop in order to detect and report a malfunction of the equipment.

7 Claims, 1 Drawing Sheet

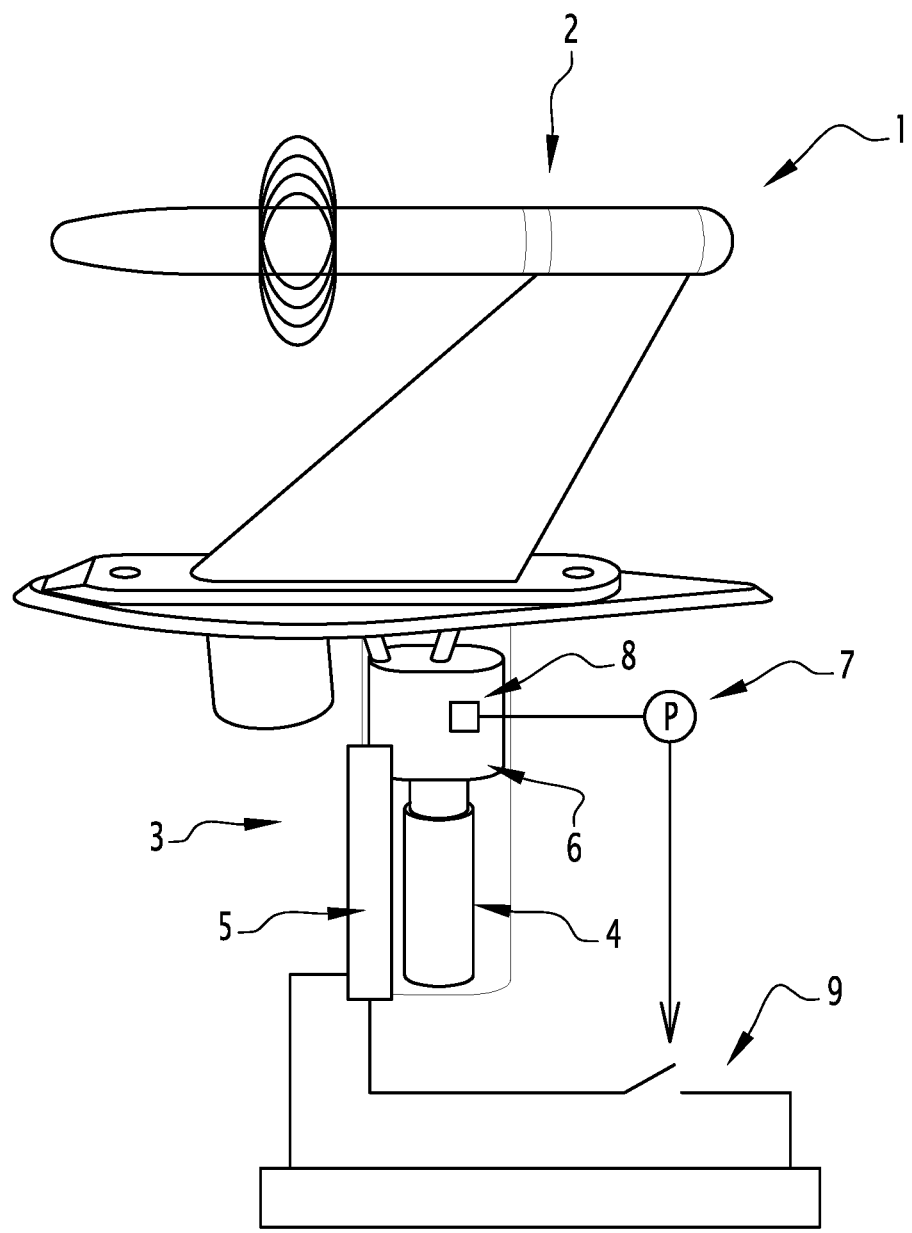

AERONAUTICAL EQUIPMENT

CROSS-REFERENCE TO RELATED APPLICATIONS

This application is a U.S. non-provisional application claiming the benefit of French Application No. 19 03182, filed on Mar. 27, 2019, which is incorporated herein by reference in its entirety.

FIELD OF THE INVENTION

The present invention relates to an aeronautical equipment for an aircraft, equipped with means making it possible to detect and indicate a failure, for example of a reheating system.

More specifically, the invention relates to an aeronautical equipment comprising a part configured to be positioned at the level of a skin of the aircraft and reheating means of this part, comprising a closed-circuit thermodynamic loop in which a phase-change heat transfer fluid circulates.

BACKGROUND

Such aeronautical equipment for an aircraft for example comprise an aerodynamic measurement probe, also referred to as Pitot tube.

This type of equipment is in particular subject to very high-speed and low-temperature airflows, which particularly cause freezing situations.

In order to be able to operate under such conditions, this equipment must therefore be reheated.

This reheating indeed for example prevents the equipment from being obstructed by ice.

Various reheating means have already been proposed in the state of the art.

Thus, for example, it has already been proposed to form such tubes by using an electrical heating wire soldered inside the probe in order to reheat it and protect it from freezing.

It has also been proposed in the state of the art to use reheating means implementing a closed-circuit thermodynamic loop, with a base of fluid channels included in its structure and in which a phase-change heat transfer fluid circulates.

This diphasic solution makes it possible to transmit a thermal power toward the exposed part of the probe, through the fluid channels integrated into the equipment.

It is known that such a reheating technique becomes particularly interesting with the emergence of additive manufacturing technologies, which make it possible to produce integrated channels with no excess cost into the equipment during the manufacturing thereof.

However, this type of diphasic solution introduces failure modes that do not exist on a probe reheated by an electric heating wire and which then cannot be detected.

SUMMARY

The aim of the invention is therefore to address these issues by respecting the aircraft interface and by reproducing a failure behavior similar to a break for example of the electric heating wire.

Indeed, the rest of the systems of the aircraft only know how to detect such a break of the electric heating wire as a failure mode.

To that end, the invention relates to an aeronautical equipment for an aircraft, comprising a part configured to be positioned at the level of a skin of the aircraft and means for reheating this part comprising a closed-circuit thermodynamic loop in which a phase-change heat transfer fluid circulates, characterized in that it includes means for monitoring the fluid pressure in the loop in order to detect and report a malfunction of the equipment.

According to other features of the equipment according to the invention, considered alone or in combination:
- the closed circuit further comprises at least one evaporator associated with heating means and at least one compensation chamber;
- the heating means comprise at least one heating resistance;
- the compensation chamber is associated with the monitoring means;
- the monitoring means comprise a pressure sensor;
- the pressure sensor is located in the compensation chamber;
- the means for monitoring the fluid pressure in the loop are suitable for detecting and reporting a malfunction of the equipment when the pressure in the circuit is close to the atmospheric pressure;
- it comprises an aerodynamic measuring probe.

BRIEF DESCRIPTION OF THE DRAWING

The invention will be better understood using the following description, provided solely as an example and done in reference to the appended drawing, which shows a block diagram illustrating the structure of an aeronautical equipment for an aircraft, according to the invention.

FIG. 1 This figure in fact illustrates an aeronautical equipment for an aircraft for example comprising an aerodynamic measuring probe designated by general reference 1.

DETAILED DESCRIPTION

Such an aerodynamic measuring probe for example includes a Pitot tube.

This Pitot tube then conventionally includes a part configured to be positioned at the level of a skin of the aircraft, and which is designated by general reference 2, and means for reheating this part, which are designated by general reference 3.

In this illustrated exemplary embodiment, these reheating means 3 comprise a closed-circuit thermodynamic loop, with a base of fluid channels included in its structure and in which a phase-change heat transfer fluid circulates.

Conventionally, this closed circuit further comprises at least one evaporator designated by general reference 4, associated with heating means designated by general reference 5 and at least one compensation chamber designated by general reference 6.

The heating means for example comprise a heating resistance.

The latter are electrically connected to the electric grid of the aircraft, which supplies the electrical power.

Channels are provided in the rest of the equipment to constitute the thermodynamic circulation loop of the phase-change heat transfer fluid.

According to the invention, the aeronautical equipment is also equipped with means for monitoring the fluid pressure in the loop in order to detect a malfunction thereof.

These means for monitoring the fluid pressure in the loop are designated by general reference 7 in this figure and are associated with the compensation chamber 6.

Indeed, these monitoring means for example comprise a pressure sensor that is for example placed in the compensation chamber 6, this sensor being designated by general reference 8.

Of course, this sensor could be placed elsewhere in the fluid reheating circuit.

This pressure sensor is then suitable for detecting and reporting a malfunction of the equipment when the pressure in the circuit drops and in particular is close to the atmospheric pressure.

Indeed, the pressure variations of the system during normal operation are not comparable to a variation of an Off-Line system (variation in atmospheric pressure around 1 bar).

Indeed, at 20° C., the saturation pressure for the fluid experienced in the application yields a value of 8.5 bars. Above 70 to 100° C., the pressure is between 39 and 89 bars, and these pressure variations are therefore easily detectable.

This pressure sensor then acts to open a circuit connecting the electrical power of this equipment to the rest of the aircraft for example by opening this circuit by means of a switch 9.

Thus, such monitoring means make it possible to detect a failure of the diphasic system by opening a contact after verification of the pressure in the compensation chamber.

One thus reproduces the operation equivalent to a cut heating wire like in the current systems, which makes it possible to use the aeronautical equipment according to the invention with current aircraft without modifying airplane interfaces and without adding surveillance electronics.

Of course, still other embodiments can be considered.

The invention claimed is:

1. An aeronautical equipment for an aircraft, comprising a part configured to be positioned at the level of a skin of the aircraft and means for reheating this part comprising a closed-circuit thermodynamic loop in which a phase-change heat transfer fluid circulates, wherein the aeronautical equipment includes means for monitoring the fluid pressure in the loop in order to detect and report a malfunction of the equipment when the pressure in the loop drops and is at about ambient atmospheric pressure.

2. The aeronautical equipment for an aircraft according to claim 1, wherein the closed circuit further comprises at least one evaporator associated with heating means and at least one compensation chamber.

3. The aeronautical equipment for an aircraft according to claim 2, wherein the heating means comprise at least one heating resistance.

4. The aeronautical equipment for an aircraft according to claim 2, wherein the compensation chamber is associated with the monitoring means.

5. The aeronautical equipment for an aircraft according to claim 4, wherein the monitoring means comprise a pressure sensor.

6. The aeronautical equipment for an aircraft according to claim 5, wherein the pressure sensor is located in the compensation chamber.

7. The aeronautical equipment according to claim 1, wherein the aeronautical equipment comprises an aerodynamic measuring probe.

* * * * *